(12) United States Patent
Kondo et al.

(10) Patent No.: US 10,128,506 B2
(45) Date of Patent: Nov. 13, 2018

(54) ELECTRODE FOR NONAQUEOUS ELECTROLYTE BATTERY, NONAQUEOUS ELECTROLYTE BATTERY AND BATTERY PACK

(71) Applicant: Kabushiki Kaisha Toshiba, Minato-ku (JP)

(72) Inventors: Asato Kondo, Yokohama (JP); Takashi Kuboki, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 85 days.

(21) Appl. No.: 15/258,499

(22) Filed: Sep. 7, 2016

(65) Prior Publication Data

US 2017/0077515 A1 Mar. 16, 2017

(30) Foreign Application Priority Data

Sep. 16, 2015 (JP) ................................. 2015-183473

(51) Int. Cl.
*H01M 4/02* (2006.01)
*H01M 4/60* (2006.01)

(52) U.S. Cl.
CPC ..................... *H01M 4/606* (2013.01)

(58) Field of Classification Search
CPC .................................................... H01M 10/00
See application file for complete search history.

(56) References Cited

U.S. PATENT DOCUMENTS

| 2007/0020385 | A1 | 1/2007 | Naoi et al. |
| 2013/0344389 | A1* | 12/2013 | Morishima ............. H01M 2/26 429/231.1 |
| 2014/0199583 | A1 | 7/2014 | Kondo et al. |
| 2014/0199584 | A1 | 7/2014 | Kondo et al. |
| 2014/0295291 | A1 | 10/2014 | Kondo et al. |
| 2014/0295299 | A1 | 10/2014 | Kondo et al. |

FOREIGN PATENT DOCUMENTS

| JP | 2003-203673 A | 7/2003 |
| JP | 2003-257479 A | 9/2003 |
| JP | 2006-294278 A | 10/2006 |
| JP | 2007-35770 A | 2/2007 |
| JP | 4806895 B2 | 11/2011 |
| JP | 2014-209453 A | 11/2014 |
| JP | 2014-209454 A | 11/2014 |
| WO | WO 2013/145109 A1 | 10/2013 |
| WO | WO 2013/145110 A1 | 10/2013 |

* cited by examiner

*Primary Examiner* — Jacob B Marks
(74) *Attorney, Agent, or Firm* — Oblon, McClelland, Maier & Neustadt, L.L.P.

(57) ABSTRACT

An electrode for a nonaqueous electrolyte battery according to the present embodiment includes: a current collector; and an active material layer that is formed on one surface or both surfaces of the current collector. The active material layer contains a fluorine-containing aromatic compound, in which at least one of hydrogen atoms bonded to the aromatic ring has been substituted by fluorine, at 0.01 mass % or more and 1.0 mass % or less.

10 Claims, 5 Drawing Sheets

US 10,128,506 B2

ELECTRODE FOR NONAQUEOUS ELECTROLYTE BATTERY, NONAQUEOUS ELECTROLYTE BATTERY AND BATTERY PACK

CROSS-REFERENCE TO RELATED APPLICATION

This application is based upon and claims the benefit of priority from Japanese Patent Application No. 2015-183473, filed Sep. 16, 2015, the entire contents of which are incorporated herein by reference.

FIELD

Embodiments described herein relate generally to an electrode for a nonaqueous electrolyte battery, a nonaqueous electrolyte battery and a battery pack.

BACKGROUND

A nonaqueous electrolyte battery represented by a lithium ion secondary battery has a high energy density. From this reason, a nonaqueous electrolyte secondary battery is used in various fields from small portable devices such as a personal computer and a smart phone to large electric power sources including an electric vehicle and a power-leveling power source.

Accompanying with the increase in power consumption of an apparatus using a nonaqueous electrolyte battery and the expansion of fields for which a nonaqueous electrolyte battery is used, it has been studied to improve large current characteristics and low-temperature characteristics.

In order to improve the large current characteristics and the low-temperature characteristics of a nonaqueous electrolyte battery, it is effective to improve electroconductivity and lithium ion conductivity. In order to improve electroconductivity, it is effective to increase the amount of an electroconductive material in a positive electrode active material layer and/or a negative electrode active material layer and to decrease the thickness of an active material layer. Also, in order to improve lithium ion conductivity, it is effective to decrease the viscosity of an electrolyte solution and to increase the concentration of a lithium ion in an electrolyte solution.

However, the increase in the amount of an electroconductive material in an active material layer and the decrease in the thickness of an active material layer cause the decrease in the energy density of a nonaqueous electrolyte battery. Also, the decrease in the viscosity of an electrolyte solution causes the deterioration of high-temperature characteristics. Also, the increase in the concentration of a lithium ion in an electrolyte solution causes the deterioration of low-temperature characteristics.

Therefore, in a conventional nonaqueous electrolyte battery, large current characteristics and low-temperature characteristics may not be sufficiently obtained.

DETAILED DESCRIPTION

Figure 1:
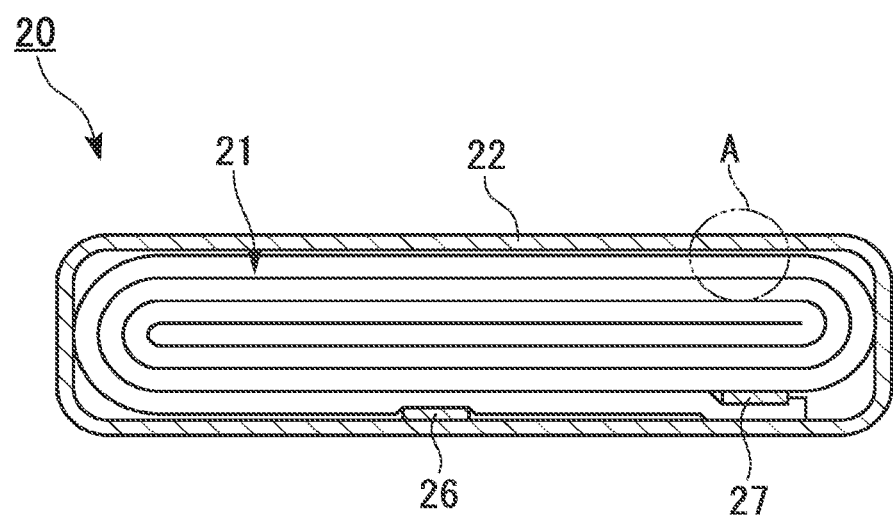
FIG. 1 is a schematic cross-sectional view illustrating the nonaqueous electrolyte battery according to the 2nd embodiment.

An electrode for a nonaqueous electrolyte battery according to the present embodiment includes: a current collector; and an active material layer that is formed on one surface or both surfaces of the current collector. The active material layer contains a fluorine-containing aromatic compound, in which at least one of hydrogen atoms bonded to the aromatic ring has been substituted by fluorine, at 0.01 mass % or more and 1.0 mass % or less.

Hereinafter, an embodiment of the present invention is described with reference to the drawings.

The inventors have carried out the extensive studies to solve the above problems, and consequently found the electrode containing a fluorine-containing aromatic compound, in which at least one of hydrogen atoms bonded to the aromatic ring has been substituted by fluorine, in an active material layer, as a positive electrode and/or a negative electrode. The excellent large current characteristics and the excellent low temperature characteristics can be obtained in the nonaqueous electrolyte battery including the aforementioned positive electrode and/or negative electrode.

(First Embodiment)

The electrode for a nonaqueous electrolyte battery of the present embodiment (hereinafter, may be abbreviated as "battery electrode") is used as a positive electrode and/or a negative electrode of a nonaqueous electrolyte battery. In the present embodiment, the battery electrode for a lithium ion secondary battery is described as an example of the battery electrode.

The battery electrode of the present embodiment includes a current collector; and an active material layer that is formed on one surface or both surfaces of a current collector.

The current collector is formed of an electroconductive material, and a material used for a current collector of a battery electrode can be used without any particular limitation.

The active material layer contains an active material, a fluorine-containing aromatic compound, an electroconductive material and a binder.

As the active material and the electroconductive material, an active material and an electroconductive material of a battery electrode can be used without any particular limitation, respectively.

The fluorine-containing aromatic compound contained in the active material layer has the structure in which at least one of hydrogen atoms bonded to the aromatic ring has been substituted by fluorine. It is preferable that the fluorine-containing aromatic compound contained in the active material layer have a carbon number of 7 or more and 30 or less. When the carbon number of the fluorine-containing aromatic compound is 7 or more, the fluorine-containing aromatic compound is hardly eluted from the active material layer to an electrolyte. For this reason, it is possible to sufficiently obtain the effect due to the inclusion of the fluorine-containing aromatic compound for a long period. The carbon number of the fluorine-containing aromatic compound is more preferably 10 or more in order to suppress the elution of the fluorine-containing aromatic compound from the active material layer to an electrolyte. Also, when the carbon number of the fluorine-containing aromatic compound is 30 or less, the solubility of the fluorine-containing aromatic compound into the solvent becomes good, and it is possible to easily produce the active material layer which contains the fluorine-containing aromatic compound. The carbon number of the fluorine-containing aromatic compound is more preferably 22 or less and much more preferably 14 or less.

The number of fluorine atoms contained in the fluorine-containing aromatic compound is preferably 3 or more and 15 or less. When the number of fluorine atoms is 3 or more, the stability of the fluorine-containing aromatic compound becomes good. For this reason, when the fluorine-containing aromatic compound having the fluorine atom number of 3 or more is contained in an electrode, it is possible to stably obtain the effect due to the fluorine-containing aromatic compound for a long period. Specifically, when the battery electrode is a positive electrode, the effect due to the fluorine-containing aromatic compound is difficult to be attenuated by oxidation reaction during charge. Also, when the battery electrode is a negative electrode, the effect due to the fluorine-containing aromatic compound is difficult to be attenuated by reduction reaction during charge. The number of fluorine atoms contained in the fluorine-containing aromatic compound is more preferably 4 or more.

When the number of fluorine atoms contained in the fluorine-containing aromatic compound is 15 or less, the affinity of the fluorine-containing aromatic compound and an electrolyte solution becomes good, and the impregnation property of an electrolyte solution for the active material layer containing the fluorine-containing aromatic compound becomes good. Also, the number of fluorine atoms contained in the fluorine-containing aromatic compound is more preferably 6 or less.

It is preferable that the fluorine-containing aromatic compound have a hydrogen atom bonded to an aromatic ring. The fluorine-containing aromatic compound in which only some of hydrogen atoms bonded to an aromatic ring have been substituted by fluorine can obtain good affinity for an electrolyte solution. For this reason, the impregnation property of an electrolyte solution for the active material layer containing the fluorine-containing aromatic compound becomes good through the hydrogen atoms bonded to an aromatic ring. The ratio of the fluorine atoms to the total of the hydrogen atoms and the fluorine atoms bonded to an aromatic ring is preferably 40% or more and 60% or less, more preferably 45% or more and 55% or less, and most preferably 50%. When the numbers of the hydrogen atoms and the fluorine atoms bonded to an aromatic ring are the same, the balance between the impregnation property of an electrolytic solution for the active material layer and the stability of the fluorine-containing aromatic compound become the best.

It is preferable that the fluorine-containing aromatic compound have at least one structure selected from naphthalene, anthracene, phenanthrene, tetracene, benzanthracene, triphenylene, chrysene, pyrene and pentacene. These fluorine-containing aromatic compounds easily form an ion pair with a positively charged atom such as a lithium ion. Therefore, it can be extrapolated that more excellent large current characteristics and low temperature characteristics can be obtained in the nonaqueous electrolyte secondary battery including the battery electrode of the present embodiment.

Naphthalene has the structure in which 2 benzene rings are bonded by sharing a side (carbon-carbon bond). Thus, the fluorine-containing aromatic compound having a naphthalene structure stably holds electrons, and easily forms an ion pair with a positively charged atom such as a lithium ion. For this reason, it is preferable that the fluorine-containing aromatic be the fluorine-containing aromatic compound having a naphthalene structure. Examples of the fluorine-containing aromatic compound having a naphthalene structure include the compounds represented by the following formulas (1) to (4).

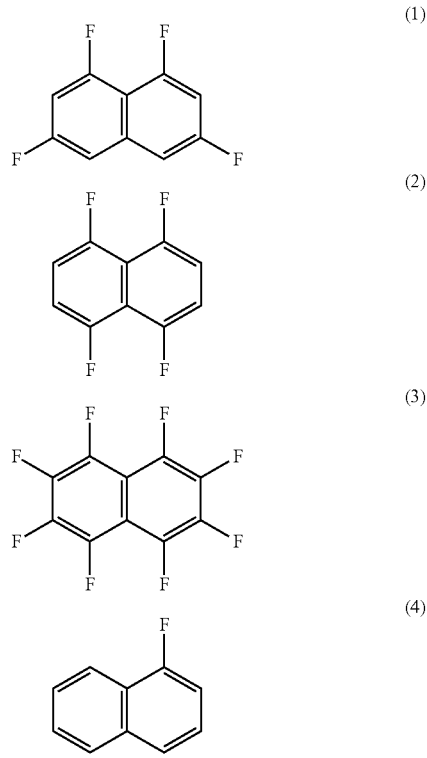

Naphthalene has 8 hydrogen atoms bonded to an aromatic ring. By preparing the fluorine-containing aromatic compound in which at least one of hydrogen atoms bonded to an aromatic ring of naphthalene has been substituted by a fluorine atom, it is possible to improve oxidation and reduction resistance and stability as compared with naphthalene. The number of fluorine atoms in the fluorine-containing aromatic compound having a naphthalene structure is preferably 3 or more and 5 or less, and tetrafluoronaphthalene having 4 fluorine atoms (such as the compound represented by the formulas (1) and (2)) is particularly preferable. In tetrafluoronaphthalene, the ratio of the fluorine atoms to the total of the hydrogen atoms and the fluorine atoms bonded to an aromatic ring is 50% (the numbers of the hydrogen atoms and the fluorine atoms bonded to an aromatic ring are the same). Tetrafluoronaphthalene is preferable in terms of the good balance between the impregnation property of an electrolytic solution for the active material layer and the good stability of the fluorine-containing aromatic compound.

In the fluorine-containing aromatic compound having a naphthalene structure, the bonding positions of fluorine atoms substituting the hydrogen atoms of naphthalene may be freely selected positions. It is preferable that the bonding position of fluorine atoms be the positions which enhance lateral symmetry and lower vertical symmetry when the lateral direction is defined as the direction in which the benzene rings of naphthalene are bonded. This kind of fluorine-containing aromatic compound has very good stability. Specifically, 1,3,6,8-tetrafluoronaphthalene represented by the formula (1), in which fluorine atoms are bonded to the positions (1, 3, 6 and 8 positions) which enhance lateral symmetry and lower vertical symmetry, has good stability as compared with the compound represented by the formula (2) in which fluorine atoms are bonded to the positions which enhance lateral symmetry and vertical symmetry. For this reason, the battery electrode containing 1,3,6,8-tetrafluoronaphthalene represented by the formula (1) as the fluorine-containing aromatic compound is preferable because it is possible to prevent the elution of the fluorine-containing aromatic compound from the active material layer into the electrolyte even when the lithium ion secondary battery including the battery electrode is heated to a high temperature.

The fluorine-containing compound having the structure in which at least 3 benzene rings are bonded by sharing sides such as anthracene forms an ion pair with a positively charged atom such as a lithium ion in the same manner as the fluorine-containing aromatic compound having a naphthalene structure. In the fluorine-containing compound having the structure in which benzene rings are bonded by sharing sides, the movement of electrons in the molecule becomes faster as the number of benzene rings increases. When the number of benzene rings is 6 or more, the function of an electronic path in the molecule exceeds the function of a flow path for lithium ions. Therefore, in the fluorine-containing aromatic compound having the structure in which plural benzene rings are bonded by sharing sides, the number of benzene rings is preferably 5 or less, more preferably 4 or less, and much more preferably 2 or 3.

Anthracene has the structure in which 3 benzene rings are bonded by sharing sides, and has 10 hydrogen atoms bonded to an aromatic ring. In the same manner as naphthalene, by preparing the fluorine-containing aromatic compound in which at least one of hydrogen atoms bonded to an aromatic ring of anthracene has been substituted by a fluorine atom, it is possible to improve oxidation and reduction resistance and stability. The number of fluorine atoms in the fluorine-containing aromatic compound having an anthracene structure is preferably 4 or more and 6 or less, and pentafluoroanthracene having 5 fluorine atoms is particularly preferable. Pentafluoroanthracene is preferable because the ratio of the fluorine atoms to the total of the hydrogen atoms and the fluorine atoms bonded to an aromatic ring is 50% (the numbers of the hydrogen atoms and the fluorine atoms bonded to an aromatic ring are the same).

In the fluorine-containing aromatic compound having the structure in which benzene rings are linearly bonded by sharing sides such as anthracene, the number of fluorine atoms bonded to one side (carbon-carbon bond) is preferably 1 or less in the same manner as the case of having a naphthalene structure. This kind of fluorine-containing aromatic compound has very good stability. Specifically, preferable examples of the fluorine-containing aromatic compound having an anthracene structure include 1,3,6,8,9-pentafluoroanthracene represented by the following formula (5) in which fluorine atoms are bonded to the positions (1, 3, 6, 8 and 9 positions) such that the number of fluorine atoms bonded to one side becomes 1 or less.

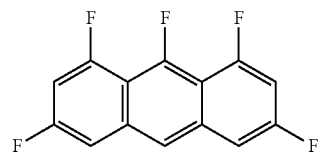

Phenanthrene has the structure in which 3 benzene rings are bonded by sharing sides, and has 10 hydrogen atoms bonded to an aromatic ring. The number of fluorine atoms in the fluorine-containing aromatic compound having a phenanthrene structure is preferably 4 or more and 6 or less, and pentafluorophenanthrene having 5 fluorine atoms is particularly preferable. Pentafluorophenanthrene is preferable because the ratio of the fluorine atoms to the total of the hydrogen atoms and the fluorine atoms bonded to an aromatic ring is 50% (the numbers of the hydrogen atoms and the fluorine atoms bonded to an aromatic ring are the same). Preferable examples of pentafluorophenanthrene include 1,3,5,7,10-pentafluorophenanthrene represented by the following formula (6) which has fluorine atoms at 1, 3, 5, 7 and 10 positions.

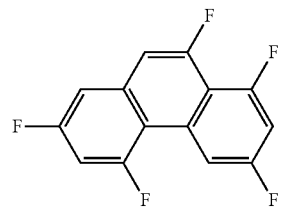

Tetracene has the structure in which 4 benzene rings are bonded by sharing sides, and has 12 hydrogen atoms bonded to an aromatic ring. The number of fluorine atoms in the fluorine-containing aromatic compound having a tetracene structure is preferably 5 or more and 7 or less, and hexafluorotetracene having 6 fluorine atoms is particularly preferable. Hexafluorotetracene is preferable because the ratio of the fluorine atoms to the total of the hydrogen atoms and the fluorine atoms bonded to an aromatic ring is 50% (the numbers of the hydrogen atoms and the fluorine atoms bonded to an aromatic ring are the same). Specifically, preferable examples of hexafluorotetracene include 1,3,8,10,11,12-hexafluorotetracene represented by the following formula (7) in which fluorine atoms are bonded to the positions (1, 3, 8, 10, 11 and 12 positions) such that the number of fluorine atoms bonded to one side (carbon-carbon bond) becomes 1 or less.

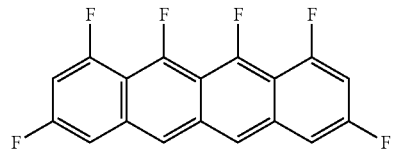

Benzoanthracene has the structure in which 4 benzene rings are bonded by sharing sides. Benzoanthracene includes benz[a]anthracene and benz[de]anthracene. Of these, the fluorine-containing aromatic compound having a benz[a]

anthracene structure is more preferable as the fluorine-containing aromatic compound having a benzoanthracene structure.

Benz[a]anthracene has 12 hydrogen atoms bonded to an aromatic ring. The number of fluorine atoms in the fluorine-containing aromatic compound having a benz[a]anthracene structure is preferably 5 or more and 7 or less, and hexafluorobenz[a]anthracene having 6 fluorine atoms is particularly preferable. Hexafluorobenz[a]anthracene is preferable because the ratio of the fluorine atoms to the total of the hydrogen atoms and the fluorine atoms bonded to an aromatic ring is 50% (the numbers of the hydrogen atoms and the fluorine atoms bonded to an aromatic ring are the same). Specifically, preferable examples of hexafluorobenz[a]anthracene include 1,3,6,7,8,10-hexafluorotetracene represented by the following formula (8) which has fluorine atoms at 1, 3, 6, 7, 8 and 10 positions.

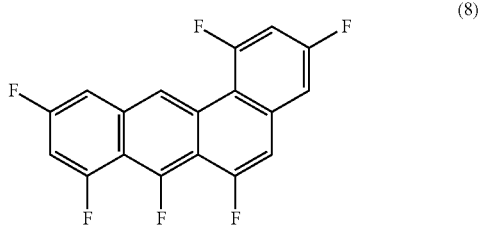 [SMILES: Fc1cc(F)c2c(F)c3c(F)cc4cc(F)cc(F)c4c3cc2c1]

(8)

Chrysene has the structure in which 4 benzene rings are bonded by sharing sides, and has 12 hydrogen atoms bonded to an aromatic ring. The number of fluorine atoms in the fluorine-containing aromatic compound having a chrysene structure is preferably 5 or more and 7 or less, and hexafluorochrysene having 6 fluorine atoms is particularly preferable. Hexafluorochrysene is preferable because the ratio of the fluorine atoms to the total of the hydrogen atoms and the fluorine atoms bonded to an aromatic ring is 50% (the numbers of the hydrogen atoms and the fluorine atoms bonded to an aromatic ring are the same). Specifically, preferable examples of hexafluorochrysene include 1,3,5,8,10,12-hexafluorochrysene represented by the following formula (9) which has fluorine atoms at 1, 3, 5, 8, 10 and 12 positions.

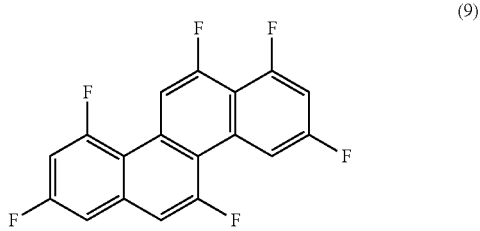 [SMILES: Fc1cc(F)c2c(c1)cc(F)c1c3cc(F)cc(F)c3c(F)cc21]

(9)

In the present embodiment, the active material layer contains the fluorine-containing aromatic compound at 0.01 mass % or more and 1.0 mass % or less. When the content of the fluorine-containing aromatic compound is less than 0.01 mass %, it is not possible to sufficiently obtain the effect due to the inclusion of the fluorine-containing aromatic compound. In order to obtain the effect due to the inclusion of the fluorine-containing aromatic compound, the content of the fluorine-containing aromatic compound is preferably 0.02 mass % or more.

Also, when the content of the fluorine-containing aromatic compound is more than 1.0 mass %, there is the possibility that the fluorine-containing aromatic compound is not dissolved in the electrolyte solution and is phase-separated. When the fluorine-containing aromatic compound is phase-separated in the electrolytic solution, the composition of the electrolyte solution varies locally, and thus, the uneven deterioration of the battery electrode is likely to occur. The content of the fluorine-containing aromatic compound is preferably 0.8 wt % or less in order to lower the possibility that the fluorine-containing aromatic compound is phase-separated in the electrolytic solution.

The content of the fluorine-containing aromatic compound in the active material layer can be measured by the following method.

First, the electrolyte solution is removed from the battery electrode by using a solvent. The supporting salt (electrolyte) contained in the electrolyte solution may release corrosive fluorine through heating. Corrosive fluorine damages a gas chromatograph mass spectrometer used to measure the content of the fluorine-containing aromatic compound. By removing the electrolyte solution from the battery electrode, it is possible to suppress the dispersion of a measurement value due to the damage of a gas chromatograph mass spectrometer.

As the solvent used to remove the electrolyte solution from the battery electrode, for example, it is possible to use a linear carbonic ester, and it is particularly preferable to use dimethyl carbonate, ethyl methyl carbonate, or diethyl carbonate. These solvents are preferable because they do not affect the evaluation results when the content of the fluorine-containing aromatic compound is evaluated by using a gas chromatograph mass spectrometer. Of these solvents, dimethyl carbonate and ethyl methyl carbonate are particularly preferable because they are stable to the active material in the battery electrode being in a charged state.

Next, the fluorine-containing aromatic compound is extracted from the battery electrode, from which the electrolyte solution has been removed, by using a solvent extraction method or a thermal extraction method.

In a solvent extraction method, the battery electrode is immersed in the extraction solvent which dissolves the fluorine-containing aromatic compound, to thereby extract the fluorine-containing aromatic compound into the solvent. As the solvent for extracting the fluorine-containing aromatic compound, for example, it is possible to use a halogen-containing organic solvent such as dichloromethane or chloroform, or an aromatic compound such as toluene or xylene.

In a thermal extraction method, the battery electrode is heated to evaporate and extract the fluorine-containing aromatic compound. The evaporated and extracted fluorine-containing aromatic compound is cooled and dissolved in a solvent. As the solvent used for dissolving the evaporated and extracted fluorine-containing aromatic compound, for example, it is possible to use a halogen-containing organic solvent such as dichloromethane or chloroform, or an aromatic compound such as toluene or xylene.

Next, the fluorine-containing aromatic compound extracted by using a solvent extraction method or a hot extraction method is analyzed by using a gas chromatograph mass spectrometer, and the results are used to determine the quantity thereof.

Herein, the fluorine-containing aromatic compound evaporated and extracted by a thermal extraction method can be directly introduced into a gas chromatograph mass spectrometer without dissolving it in a solvent, and can be analyzed.

As the binder contained in the active material layer, it is possible to use a fluorinated resin and an acrylic resin, and it is preferable to use a fluorinated resin. A fluorinated resin has high affinity for the fluorine-containing aromatic compound, and thus, by using a fluorinated resin as the binder, it is possible to disperse the fluorine-containing aromatic compound in the binder. For this reason, by using a fluorinated resin as the binder, the conductivity of a lithium ion in the active material layer is improved.

It is preferable that the fluorinated resin used as the binder contain, as a main component, at least one monomer selected from vinyl fluoride, vinylidene fluoride, chlorofluoroethylene, hexafluoropropene and trifluorochloroethylene. These fluorinated resins are dissolved in a common solvent such as N-methyl-2-pyrrolidone (NMP), and thus, the dispersibility in the active material layer is high. As the fluorinated resin used as the binder, it is particularly preferable to use polyvinylidene fluoride (PVDF).

It is preferable that the fluorinated resin used as the binder contain at least one monomer selected from acrylic acid, sodium acrylate, lithium acrylate, and an acrylic ester. Acrylic acid, sodium acrylate, lithium acrylate and an acrylic ester have the effect of improving the binding force of the binder to the current collector.

A production method of the battery electrode of the present embodiment is not particularly limited.

For example, the electrode slurry containing the active material, the electroconductive material, the binder and the solvent is prepared. Subsequently, the fluorine-containing aromatic compound is added in the electrode slurry, to thereby prepare the coating solution. Next, the coating solution is applied on one surface or both surfaces of the current collector, and was dried. By carrying out the aforementioned steps, it is possible to produce the battery electrode including the active material layer containing the fluorine-containing aromatic compound.

Also, the following production method can be used as the production method of the battery electrode. The active material-containing layer including the active material, the electroconductive material and the binder is formed on one surface or both surface of the current collector. Also, the fluorine-containing aromatic compound is dissolved in a solvent, to thereby prepare the fluorine-containing aromatic compound solution. As the solvent for dissolving the fluorine-containing aromatic compound, an organic solvent containing chlorine or fluorine is preferable in terms of solubility. Thereafter, the active material-containing layer formed on one surface or both surfaces of the current collector is immersed in the fluorine-containing aromatic compound solution, and was dried. Through the aforementioned steps, it is possible to obtain the battery electrode including the active material layer containing the fluorine-containing aromatic compound.

In the production method, the coating solution does not need to be prepared by adding the fluorine-containing aromatic compound, which has poor affinity for the solvent for dissolving the binder, in the electrode slurry containing the active material, the electroconductive material, the binder and the solvent. For this reason, the battery electrode is easily produced as compared with the case of preparing the coating solution.

The battery electrode of the present embodiment includes the current collector and the active material layer that is formed on one surface or both surfaces of the current collector, wherein the active material layer contains the fluorine-containing aromatic compound, in which at least one of hydrogen atoms bonded to the aromatic ring has been substituted by fluorine, at 0.01 mass % or more and 1.0 mass % or less. It is extrapolated that the fluorine-containing aromatic compound contained in the active material layer is excellent in oxidation and reduction resistance and forms an ion pair with a positively charged atom such as a lithium ion. For this reason, it is extrapolated that the excellent large current characteristics and the excellent low temperature characteristics can be obtained in the nonaqueous electrolyte secondary battery including the battery electrode of the present embodiment.

Because the fluorine-containing aromatic compound is excellent in thermal stability, in the nonaqueous electrolyte secondary battery including the battery electrode of the present embodiment, the deterioration of battery characteristics during high-temperature use or after high-temperature storage is small, and also, gas generation due to thermal decomposition is small.

In the embodiment described above, the battery electrode for a lithium ion secondary battery is described as an example of the battery electrode, but the battery electrode of the embodiment can be used for an electrode of a sodium ion secondary battery, a potassium ion secondary battery and a lithium-potassium ion secondary battery, etc.

(Second Embodiment)

Figure 2:
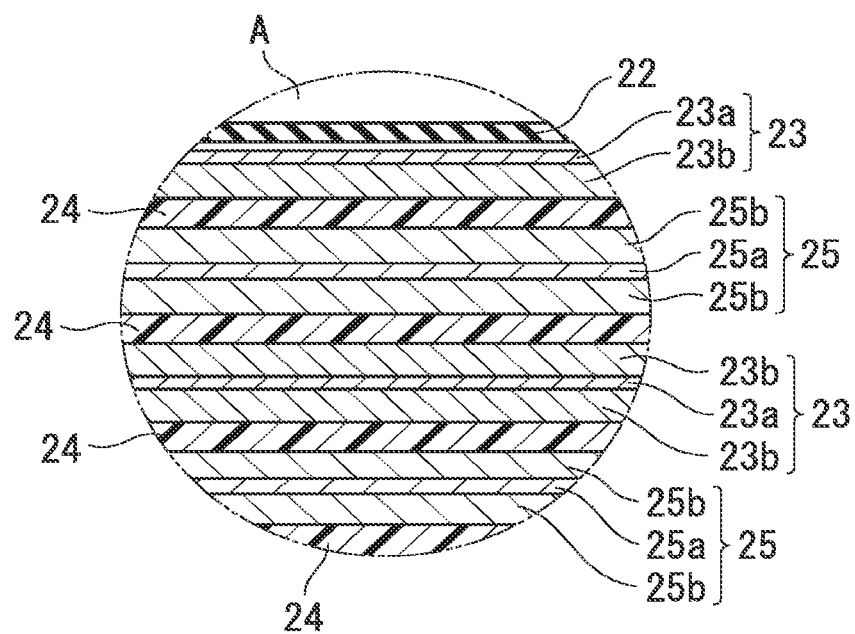
FIG. 2 is an enlarged schematic cross-sectional view illustrating the part A of FIG. 1.

Next, the flat type nonaqueous electrolyte secondary battery (nonaqueous electrolyte secondary battery) 20 illustrated in FIG. 1 and FIG. 2 is described as an example of the nonaqueous electrolyte battery according to the present embodiment. In the nonaqueous electrolyte secondary battery 20, the positive electrode 25 and the negative electrode 23 are comprised of the aforementioned battery electrode.

FIG. 1 is a schematic cross-sectional view illustrating the cross-section of the flat type nonaqueous electrolyte secondary battery 20. Also, FIG. 2 is an enlarged cross-sectional view illustrating the part A illustrated in FIG. 1. These drawings are schematic diagrams for describing the nonaqueous electrolyte secondary battery according to the embodiment, and the shapes, dimensions, ratios, and the like are different from those of actual device at some parts. The design of the shape, dimensions, ratios, and the like can be appropriately modified in consideration of the following description and known technologies.

The flat type nonaqueous electrolyte secondary battery 20 illustrated in FIG. 1 is configured such that the winding electrode group 21 with a flat shape and the nonaqueous electrolyte are housed in the exterior material 22. The exterior material 22 may be a container obtained by forming a laminated film in a bag-like shape or may be a metal container. Also, the winding electrode group 21 with the flat shape is formed by spirally winding the laminated product obtained by laminating the negative electrode 23, the separator 24, the positive electrode 25 and the separator 24 from the outside, i.e. the side of the exterior material 22, in this order, followed by performing press-molding. As illustrated in FIG. 2, the negative electrode 23 located at the outermost periphery has the configuration in which the negative electrode layer 23b is formed on one surface of the negative electrode current collector 23a on the inner surface side. The negative electrodes 23 at the parts other than the outermost periphery have the configuration in which the negative electrode layers 23b are formed on both surfaces of the negative current collector 23a. Also, the positive electrode 25 has the configuration in which the positive electrode layers 25h are formed on both surfaces of the positive current collector 25a.

In the vicinity of the outer peripheral end of the winding electrode group 21 illustrated in FIG. 1, the negative electrode terminal 26 is electrically connected to the negative current collector 23a of the negative electrode 23 of the outermost periphery. The positive electrode terminal 27 is electrically connected to the positive current collector 25a of the inner positive electrode 25. The negative electrode terminal 26 and the positive electrode terminal 27 extend toward the outer portion of the exterior material 22, and are connected to the extraction electrodes included in the exterior material 22.

When manufacturing the nonaqueous electrolyte secondary battery 20 including the exterior material formed of the laminated film, the winding electrode group 21 to which the negative electrode terminal 26 and the positive electrode terminal 27 are connected is charged in the exterior material 22 having the bag-like shape with an opening, the nonaqueous electrolyte is injected from the opening of the exterior material 22, and the opening of the exterior material 22 with the bag-like shape is subjected to heat-sealing in the state of sandwiching the negative electrode terminal 26 and the positive electrode terminal 27 therebetween. Through this process, the winding electrode group 21 and the liquid nonaqueous electrolyte are completely sealed.

Also, when manufacturing the nonaqueous electrolyte battery 20 having the exterior material formed of the metal container, the winding electrode group 21 to which the negative electrode terminal 26 and the positive electrode terminal 27 are connected is charged in the metal container having an opening, the nonaqueous electrolyte is injected from the opening of the exterior material 22, and the opening is sealed by mounting a cover member on the metal container.

For the negative electrode terminal 26, it is possible to use the material having electric stability and electroconductivity, for example. Specific examples of this material include copper, nickel, steel and aluminum; and a copper alloy, a nickel alloy, a stainless steel and an aluminum alloy which contains an element such as Mg, Ti, Zn, Mn, Fe, Cu, Si, Zn, Mo, Cr or Ni. Also, it is more preferable that the negative electrode terminal 26 be formed of the same material as the negative current collector 23a in order to reduce the contact resistance with the negative current collector 23a.

For the positive electrode terminal 27, it is possible to use the material having electric stability and electroconductivity. Specific examples of this material include aluminum and an aluminum alloy containing an element such as Mg, Ti, Zn, Mn, Fe, Cu or Si. It is more preferable that the positive electrode terminal 27 be formed of the same material as the positive current collector 25a in order to reduce the contact resistance with the positive current collector 25a.

(1) Positive Electrode

The positive electrode 25 includes the current collector and the active material layer which is formed on one surface or both surfaces of the current collector.

The current collector can be used without any particular limitation as long as it is formed of an electroconductive material. As the specific current collector, it is preferable to use an aluminum foil or an aluminum alloy foil containing at least one element selected from the group consisting of Mg, Ti, Zn, Mn, Fe, Cu and Si.

The active material layer of the positive electrode 25 includes the positive electrode active material, the fluorine-containing aromatic compound, the electroconductive agent and the binder.

As the fluorine-containing aromatic compound, it is possible to use the fluorine-containing aromatic compound contained in the active material layer of the battery electrode according to the aforementioned 1st embodiment.

As the binder, it is possible to use the binder contained in the active material layer of the battery electrode according to the aforementioned 1st embodiment.

The positive electrode active material is not particularly limited as long as it can be used for the nonaqueous electrolyte secondary battery. Examples of the positive electrode active material include a composite oxide containing lithium and a metal other than lithium, and lithium composite phosphate compound.

In a composite oxide containing lithium and a metal other than lithium, examples of a metal other than lithium include at least one metal selected from Fe, Ni, Co, Mn, V, Al and Cr.

Examples of the composite oxide containing lithium and Mn include $LiMn_2O_4$ and $Li_{(1+x)}Mn_{(2-x-y)}M_yO_z$ ($0 \leq x \leq 0.2$, $0 \leq y \leq 1.1$, $3.9 \leq z \leq 4.1$ M represents at least one element selected from Ni, Co and Fe).

Examples of the composite oxide containing lithium and Ni include $Li(Ni_xM_y)O_2$ ($x+y=1$, $0<x \leq 1$, $0 \leq y \leq 1$, M represents at least one element selected from Co and Al).

Examples of the composite oxide containing lithium, and V or Cr include $LiVO_2$ and $LiCrO_2$.

Examples of a lithium composite phosphate compound include composite phosphate compounds represented by $LiCoO_2$, $LiCoPO4$, $LiMnPO_4$, $LiFePO_4$, $Li(Fe_xM_y)PO_4$ ($x+y=1$, $0<x<1$, M represents at least one element selected from Co and Mn) and $Li(Co_xMn_y)PO_4$ ($x+y=1$, $0<x<1$).

Of these, the positive electrode active material, in which the charge cut-off voltage is 4.0 V or more with respect to Li/Li$^+$, is preferable because the effect of the present embodiment is significant. Examples of the composite oxide containing lithium and Mn include $LiMn_2O_4$ and $Li_{(1+x)}Mn_{(2-x-y)}M_yO_z$ ($0 \leq x \leq 0.2$, $0 \leq y \leq 1.1$, $3.9 \leq z \leq 4.1$, M represents at least one element selected from Ni, Co and Fe). Specific examples thereof include $LiMn_{1.5}Ni_{0.5}O_4$, $LiMn_{1.5}Co_{0.5}O_4$, $LiMnFeO_4$, $LiMn_{1.5}Fe_{0.5}O_4$, $LiMnCoO_4$, $Li(Ni_{1/3}Co_{1/3}Mn_{1/3})O_2$, $Li(Ni_{5/10}Co_{2/10}Mn_{3/10})O_2$, $Li(Ni_{6/10}Co_{2/10}Mn_{2/10})O_2$ and $Li(Ni_{8/10}Co_{1/10}Mn_{1/10})O_2$.

Also, examples of the composite oxide containing lithium and Ni include $Li(Ni_xM_y)O_2$ ($x+y=1$, $0<x \leq 1$, $0 \leq y \leq 1$, M represents at least one element selected from Co and Al). Specific examples thereof include $LiNiO_2$, $LiCo_{0.5}Ni_{0.5}O_2$, $LiNi_{0.9}Al_{0.1}O_2$ and $LiNi_{0.8}Co_{0.1}Al_{0.1}O_2$.

Moreover, the positive electrode active material, in which the charge cut-off voltage is 4.8 V or more with respect to Li/Li$^+$, is preferable because the effect of the present embodiment is particularly significant. Specific examples thereof include $LiMn_{1.5}Ni_{0.5}O_4$, $LiMn_{1.5}Co_{0.5}O_4$, $LiMn_{1.5}Fe_{0.5}O_4$, $LiMnCoO_4$, $LiMnFeO_4$ and $Li(Co_xM_y)PO_4$ ($x+y=1$, $0<x<1$, M represents at least one element selected from Fe and Mn).

It is preferable that the positive electrode active material be in a particle shape. The average particle size of the particulate positive electrode active materials is set, for example, within a range of 1 nm to 100 μm, and is preferably within the range of 10 nm to 30 μm. It is preferable that the specific surface area of the particulate positive electrode active material be within a range of 0.1 to 10 m$^2$/g.

The positive electrode active material can be used singly, or can be used by mixing plural types thereof. Moreover, the positive electrode active material can contain an electroconductive polymer material and an organic material-based active material such as a disulfide-based polymer material.

The electroconductive material can be used without any particular limitation as long as it is a material which is electroconductive and is not dissolved during charge. As the electroconductive material, it is possible to use, for example, a carbon material such as acetylene black, carbon black or graphite; a metal powder material selected from aluminum and titanium; an electroconductive ceramic material; or an electroconductive glass material.

It is preferable that the content of the positive electrode active material in the active material layer of the positive electrode 25 be within a range of 80 to 95 mass %.

It is preferable that the content of the electroconductive material in the active material layer of the positive electrode 25 be within a range of 3 to 18 mass %.

It is preferable that the content of the binder in the active material layer of the positive electrode 25 be within a range of 2 to 7 mass %.

(2) Negative Electrode

The negative electrode 23 includes the current collector and the active material layer which is formed on one surface or both surfaces of the current collector.

The current collector can be used without any particular limitation as long as it is formed of an electroconductive material. As the specific current collector, it is possible to use a foil, mesh, a punched metal or a lath metal formed of copper, a stainless steel or nickel, etc.

The active material layer of the negative electrode 23 includes the negative electrode active material, the fluorine-containing aromatic compound, the electroconductive agent and the binder.

As the fluorine-containing aromatic compound, it is possible to use the fluorine-containing aromatic compound contained in the active material layer of the battery electrode according to the aforementioned 1st embodiment.

As the binder, it is possible to use the binder contained in the active material layer of the battery electrode according to the aforementioned 1st embodiment.

As a material of the negative electrode active material, it is preferable to use graphite-based carbon materials and a lithium-titanium composite oxide, etc.

It is preferable that a lithium-titanium composite oxide has a lithium ion insertion potential of 0.4 V or more (with respect to Li/Li$^+$). Examples of the lithium ion insertion potential of 0.4 V or more (with respect to Li/Li$^+$) include the lithium titanate ($Li_4Ti_5O_{12}$) having a spinel structure and the lithium titanate ($Li_2Ti_3O_7$) having a ramsdellite structure. The aforementioned lithium-titanium composite oxide can be used singly or can be used by mixing two or more types thereof. Also, it is possible to use the titanium oxide (for example, $TiO_2$), which is converted into a lithium-titanium composite oxide by charge and discharge, as the negative electrode active material.

It is preferable that the negative electrode active material have an average particle size (average primary particle size) of 20 μm or less. When the average particle size of the negative electrode active material is 20 μm or less, the effective area contributing to a reaction can be sufficiently ensured, and therefore, it is possible to obtain good large current discharge characteristics.

It is preferable that the specific surface area of the negative electrode active material be within a range of 1 to 10 $m^2$/g. When the specific surface area of the negative electrode active material is 1 $m^2$/g or more, the effective area contributing to a reaction can be sufficiently ensured, and therefore, it is possible to obtain good large current discharge characteristics. On the other hand, when the specific surface area of the negative electrode active material is 10 $m^2$/g or less, the reaction of the negative electrode active material and the nonaqueous electrolyte is suppressed, and therefore, it is possible to suppress the deterioration of charge and discharge efficiency and gas generation during storage.

The electroconductive material can be used without any particular limitation as long as it is a material which is electroconductive and is not dissolved during charge. As the electroconductive material, it is possible to use, for example, a carbon material such as acetylene black, carbon black or graphite; a metal powder material selected from copper, nickel, steel and a stainless steel; an electroconductive ceramic material; or an electroconductive glass material.

It is preferable that the total content of the negative electrode active material and the electroconductive material in the active material layer of the negative electrode 23 be within a range of 55 to 98 mass %.

When the electroconductive material contains a material that does not function as an active material, it is preferable that the content of the electroconductive material that does not function as an active material in the active material layer of the negative electrode 23 be within a range of 0 to 25 mass %.

It is preferable that the content of the binder in the active material layer of the negative electrode 23 be within a range of 2 to 20 mass %.

(3) Nonaqueous Electrolyte

The nonaqueous electrolyte is a liquid nonaqueous electrolyte solution prepared by dissolving an electrolyte in a nonaqueous solvent (an organic solvent). The nonaqueous electrolyte is held in the gap in the electrode group.

As the nonaqueous solvent, it is preferable to use ethylene carbonate, propylene carbonate, ethyl methyl carbonate, diethyl carbonate, dimethyl carbonate, γ-butyrolactone, γ-valerolactone, α-acetyl-γ-butyrolactone, α-methyl-γ-butyrolactone, methyl acetate, ethyl acetate, methyl propionate, ethyl butyrate, butyl acetate, n-propyl acetate, isobutyl propionate or benzyl acetate, etc.

It is possible to use only one type of these nonaqueous solvents or the combination of 2 types or more thereof. Of these nonaqueous solvents, particularly preferable examples include ethylene carbonate, propylene carbonate, ethyl methyl carbonate and γ-butyrolactone. When mainly using γ-butyrolactone or propylene carbonate as the nonaqueous solvent, it is possible to add a linear carbonic ester such as diethyl carbonate, dimethyl carbonate or ethyl methyl carbonate in order to decrease the viscosity. Also, it is possible to add a cyclic carbonic ester such as ethylene carbonate in order to increase the dielectric constant.

When the nonaqueous solvent contains an aliphatic carboxylic ester, the content of an aliphatic carboxylic ester in the nonaqueous solvent is preferably 30 mass % and more preferably 20 mass %.

It is particularly preferable that the nonaqueous solvent used in the present embodiment have the compositions of the following nonaqueous solvent 1-5.

<Nonaqueous Solvent 1>

The nonaqueous solvent 100 vol % comprised of ethylene carbonate 5 to 50 vol % and ethyl methyl carbonate 50 to 95 vol %.

<Nonaqueous Solvent 2>

The nonaqueous solvent 100 vol % comprised of ethylene carbonate 5 to 50 vol % and diethyl carbonate 50 to 95 vol %.

<Nonaqueous Solvent 3>

The nonaqueous solvent 100 vol % comprised of propylene carbonate 20 to 60 vol % and ethyl methyl carbonate 40 to 80 vol %.

<Nonaqueous Solvent 4>

The nonaqueous solvent 100 vol % comprised of propylene carbonate 20 to 60 vol % and diethyl carbonate 40 to 80 vol %.

<Nonaqueous Solvent 5>

The nonaqueous solvent 100 vol % comprised of ethylene carbonate 5 to 50 vol %, propylene carbonate 50 to 100 vol % and γ-butyrolactone 0 to 50 vol %.

In the nonaqueous electrolyte, it is preferable to add at least one selected from the group consisting of a carbonic ester-based additive and a sulfur compound-based additive in terms of further improving the effect of suppressing gas generation.

It is considered that a carbonic ester-based additive has the effect of decreasing the gases such as $H_2$ and $CH_4$ generated on the surface of the negative electrode through film formation, etc. Examples of a carbonic ester-based additive include vinylene carbonate, phenyl ethylene carbonate, phenyl vinylene carbonate, diphenyl vinylene carbonate, trifluoropropylene carbonate, chloroethylene carbonate, methoxypropylene carbonate, vinyl ethylene carbonate, catechol carbonate, tetrahydrofuran carbonate, diphenyl carbonate and diethyl dicarbonate. It is possible to use only one type of these carbonic ester-based additives or the combination of 2 types or more thereof. Of these carbonic ester-based additives, vinylene carbonate and phenyl vinylene carbonate are preferable, and vinylene carbonate is particularly preferable because the effect of decreasing the gases generated on the surface of the negative electrode is significant.

It is considered that a sulfur compound-based additive has the effect of decreasing the gases such as $CO_2$ generated on the surface of the positive electrode through film formation, etc. Examples of a sulfur compound-based additive include ethylene sulfite, ethylene trithiocarbonate, vinylene trithiocarbonate, catechol sulfite, tetrahydrofuran sulfite, sulfolane, 3-methylsulfolane, sulfolene, propanesultone and 1,4-butanesultone. It is possible to use only one type of these sulfur compound-based additives or the combination of 2 types or more thereof. Of these sulfur compound-based additives, propanesultone, sulfolane, ethylene sulfite and catechol sulfite are preferable, and propanesultone is particularly preferable because the effect of decreasing the gases generated on the surface of the positive electrode is significant.

The total addition ratio of at least one selected from the group consisting of the carbonic ester-based additive and the sulfur compound-based additive is preferably 0.1 to 10 parts by mass and more preferably 0.5 to 5 parts by mass with respect to 100 parts by mass of the nonaqueous electrolyte. When the addition ratio of these additives with respect to 100 parts by mass of the nonaqueous electrolyte is 0.1 parts by mass or more, it is possible to sufficiently obtain the effect of suppressing gas generation. Also, when the addition ratio of these additives with respect to 100 parts by mass of the nonaqueous electrolyte is 10 parts by mass or less, a film formed on the electrode is not too thick to deteriorate discharge characteristics.

When using both of the carbonic ester-based additive and the sulfur compound-based additive, the addition ratio of these (carbonic ester-based additive:sulfur compound-based additive) is preferably 1:9 to 9:1 because it is possible to obtain the both effects with good balance.

The addition ratio of the carbonic ester-based additive with respect to 100 parts by mass of the nonaqueous electrolyte is preferably 0.1 to 10 parts by mass and more preferably 0.5 to 5 parts by mass. When the addition ratio of the carbonic ester-based additive with respect to 100 parts by mass of the nonaqueous electrolyte is 0.1 parts by mass or more, it is possible to sufficiently obtain the effect of decreasing gas generation in the negative electrode. When the addition ratio of the carbonic ester-based additive with respect to 100 parts by mass of the nonaqueous electrolyte is 10 parts by mass or less, a film formed on the electrode is not too thick to deteriorate discharge characteristics.

The addition ratio of the sulfur compound-based additive with respect to 100 parts by mass of the nonaqueous electrolyte is preferably 0.1 to 10 parts by mass and more preferably 0.5 to 5 parts by mass. When the addition ratio of the sulfur compound-based additive with respect to 100 parts by mass of the nonaqueous electrolyte is 0.1 parts by mass or more, it is possible to sufficiently obtain the effect of decreasing gas generation in the positive electrode. When the addition ratio of the sulfur compound-based additive with respect to 100 parts by mass of the nonaqueous electrolyte is 10 parts by mass or less, a film formed on the electrode is not too thick to deteriorate discharge characteristics.

As the electrolyte in the nonaqueous electrolyte, it is possible to use an alkali salt. As the preferable electrolyte, lithium salt is used. Examples of the lithium salt include $LiPF_4(CF_3)_2$, $LiPF_4(C_2F_5)_2$, $LiPF_3(CF_3)_3$, $LiPF_3(C_2F_5)_3$, $LiPF_4(CF_3SO_2)_2$, $LiPF_4(C_2F_5SO_2)_2$, $LiPF_3(CF_3SO_2)_3$, $LiPF_3(C_2F_5SO_2)_3$, $LiBF_2(CF_3)_2$, $LiBF_2(C_2F_5)_2$, $LiBF_2(CF_3SO_2)_2$, $LiBF_2(C_2F_5SO_2)_2$, $LiPF_6$, $LiBF_4$, $LiSbF_6$ and $LiAsF_6$.

When at least one selected from the group consisting of $LiPF_6$, $LiBF_4$, $LiSbF_6$ and $LiAsF_6$ is contained as an electrolyte in the nonaqueous electrolyte, these salts are preferentially reacted on the positive electrode 25, and a film having good quality is formed on the positive electrode 25. As a result, this film suppresses the reaction in which the fluorine-containing aromatic compound contained in the positive electrode 25 is decomposed on the positive electrode 25.

(4) Separator

The separator 24 isolates the positive electrode 25 and the negative electrode 23 so as to prevent the short circuit through the contact of the both electrodes and to allow passage of a lithium ion. For example, the separator 24 can be a porous film formed of a synthetic resin of polytetrafluoroethylene, polypropylene or polyethylene, etc., or can be a porous film formed of ceramics. Also the separator can have the structure in which these 2 or more types of porous films are laminated. Also, a thin film of lithium ion conductive ceramics can be used as the separator.

(5) Exterior Material

As the exterior material which houses the positive electrode, the negative electrode and the nonaqueous electrolyte, a metal container or an exterior container made of a laminated film is used.

As a metal container, the metal can, which is formed of aluminum, an aluminum alloy, iron or stainless steel in a rectangular or cylindrical shape, is used. As an aluminum alloy, an alloy containing an element such as magnesium, zinc or silicon is preferred. When a transition metal such as iron, copper, nickel or chromium is contained in the aluminum alloy, the content of the transition metal is preferably 100 ppm or less. Because the metal container made of the aluminum alloy has the much greater strength than the metal container made of aluminum, the thickness of the metal container can be reduced. As a result, it is possible to realize the thin and lightweight nonaqueous electrolyte secondary battery which has high power and excellent heat radiation property.

Examples of an exterior container made of a laminated film include containers made of a multi-layer film in which an aluminum foil is coated with a resin film. As a resin constituting a resin film, it is possible to use a polymer compound such as polypropylene (PP), polyethylene (PE), nylon or polyethylene terephthalate (PET), etc.

Figure 3:
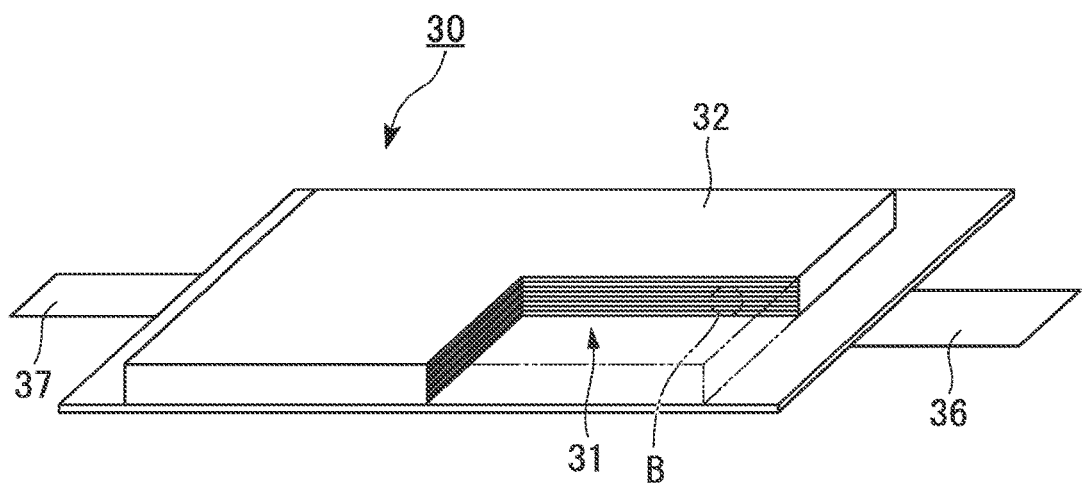
FIG. 3 is a partial cutout perspective view illustrating another nonaqueous electrolyte battery according to the 2nd embodiment.
Figure 4:
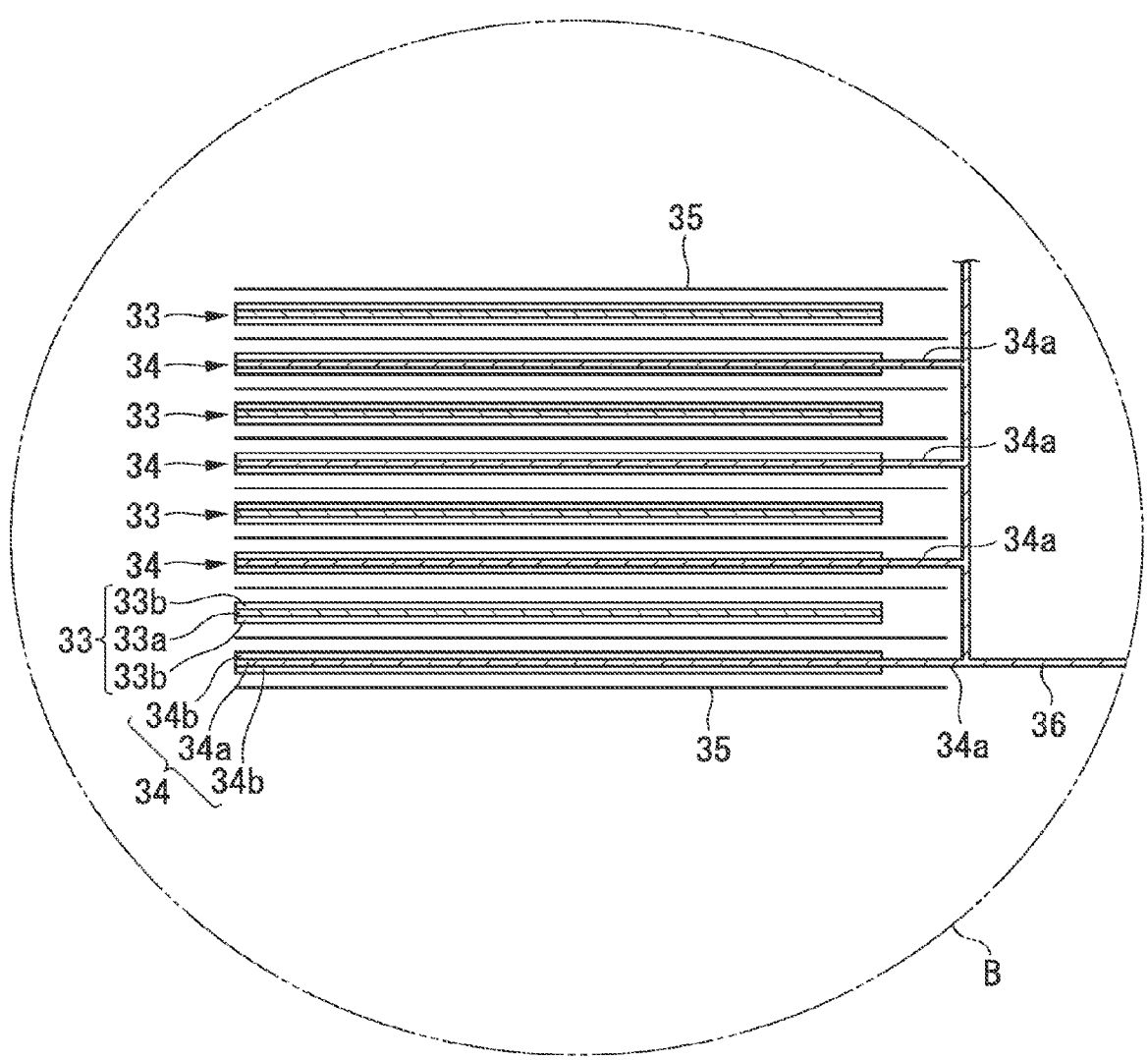
FIG. 4 is an enlarged schematic cross-sectional view illustrating the part B of FIG. 3.

The configuration of the nonaqueous electrolyte battery according to the 2nd embodiment is not limited to the aforementioned configuration illustrated in FIG. 1 and FIG. 2. For example, the batteries having the configurations illustrated in FIG. 3 and FIG. 4 can be used. FIG. 3 is a partial cutout perspective view schematically illustrating another flat type nonaqueous electrolyte secondary battery according to the 2nd embodiment. FIG. 4 is an enlarged schematic cross-sectional view illustrating the part B of FIG. 3.

The nonaqueous electrolyte secondary battery 30 illustrated in FIG. 3 and FIG. 4 is configured such that the lamination type electrode group 31 is housed in the exterior member 32. As illustrated in FIG. 4, the lamination type electrode group 31 has the structure in which the positive electrodes 33 and negative electrodes 34 are alternately laminated while interposing separators 35 therebetween.

The plurality of positive electrodes 33 is present and each includes the positive electrode current collector 33a and the positive electrode layers 33b supported on both surfaces of the positive electrode current collector 33a. The positive electrode layer 33b contains the positive electrode active material.

The plurality of negative electrodes 34 is present and each includes the negative electrode current collector 34a and the negative electrode layers 34b supported on both surfaces of the negative electrode current collector 34a. The negative electrode layer 34b contains the negative electrode material. One side of the negative electrode current collector 34a of each negative electrode 34 protrudes from the negative electrode 34. The protruding negative electrode current collector 34a is electrically connected to a strip-shaped negative electrode terminal 36. The front end of the strip-shaped negative electrode terminal 36 is drawn from the exterior member 32 to the outside. Although not illustrated, in the positive electrode current collector 33a of the positive electrode 33, the side located opposite to the protruding side of the negative electrode current collector 34a protrudes from the positive electrode 33. The positive electrode current collector 33a protruding from the positive electrode 33 is electrically connected to the strip-shaped positive electrode terminal 37. The front end of the strip-shaped positive electrode terminal 37 is located on an opposite side to the negative electrode terminal 36, and is drawn from the side of the exterior member 32 to the outside.

The material, a mixture ratio, dimensions, and the like of each member included in the nonaqueous electrolyte secondary battery 30 illustrated in FIG. 3 and FIG. 4 are configured to be the same as those of each constituent member of the nonaqueous electrolyte secondary battery 20 described in FIG. 1 and FIG. 2.

According to the present embodiment described above, it is possible to provide the nonaqueous electrolyte battery.

The nonaqueous electrolyte battery according to the present embodiment includes the negative electrode, the positive electrode, the nonaqueous electrolyte, the separator and the exterior material. The positive electrode and the negative electrode is comprised of the battery electrode according to the aforementioned 1st embodiment.

The battery electrode contains, within the active material layer, the fluorine-containing aromatic compound, in which at least one of hydrogen atoms bonded to the aromatic ring has been substituted by fluorine, at 0.01 mass % or more and 1.0 mass % or less. Accordingly, the nonaqueous electrolyte battery according to the present embodiment is excellent in large current characteristics and low-temperature characteristics.

In the aforementioned embodiment, there has been described the nonaqueous electrolyte secondary battery in which the aforementioned battery electrode is used for both of the positive electrode and the negative electrode as an example. However, it is possible to use the aforementioned battery electrode for either the positive electrode or the negative electrode.

(Third Embodiment)

Next, the nonaqueous electrolyte secondary battery pack is described in detail as the battery pack according to the 3rd embodiment.

The battery pack according to the present embodiment includes at least one nonaqueous electrolyte battery according to the aforementioned 2nd embodiment (i.e. a single battery). When the plurality of single batteries is included in the battery pack, the respective single batteries are disposed so as to be electrically connected in series, in parallel, or in series and parallel.

Figure 5:
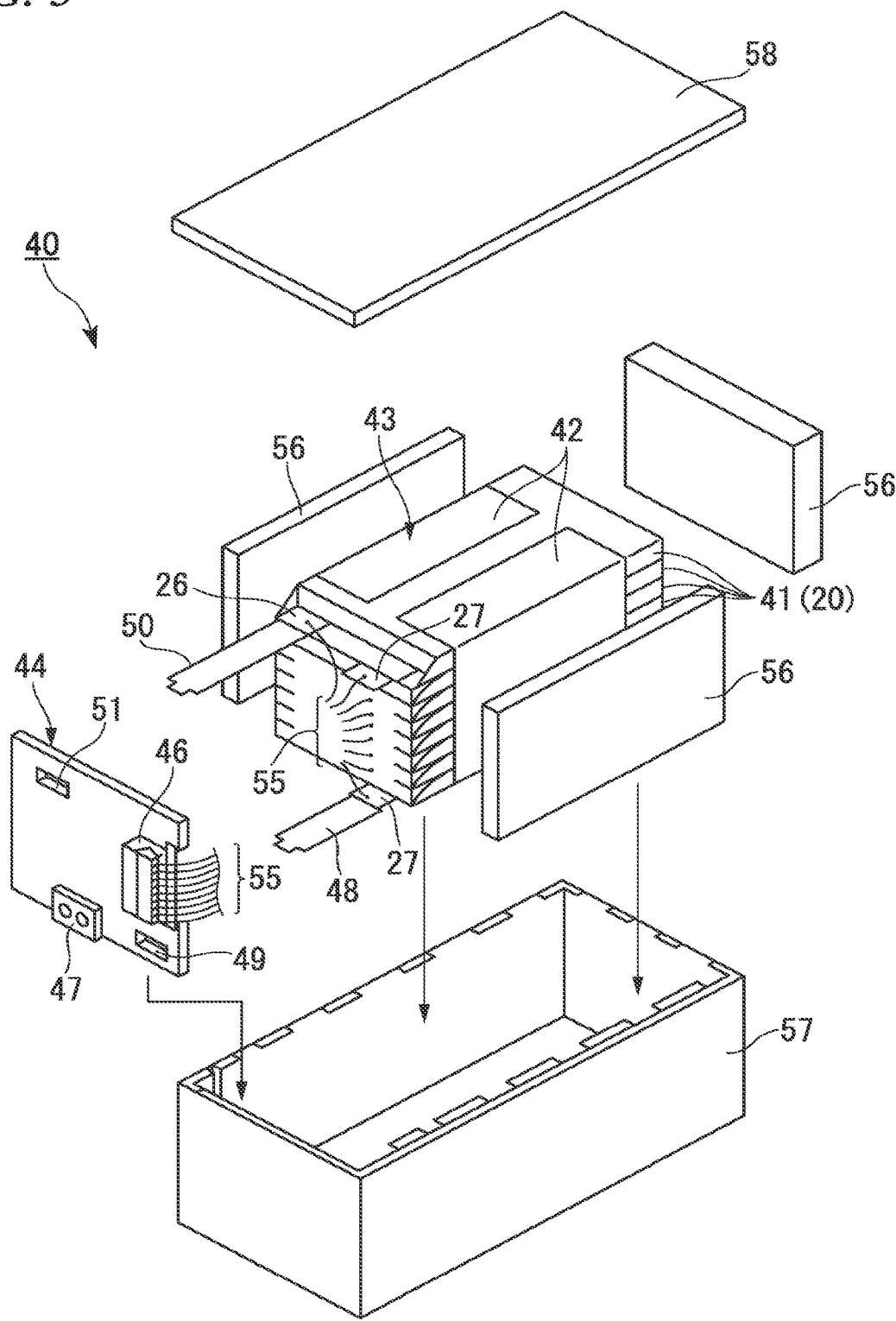
FIG. 5 is a schematic, exploded, perspective view illustrating the battery pack according to the 3rd embodiment.
Figure 6:
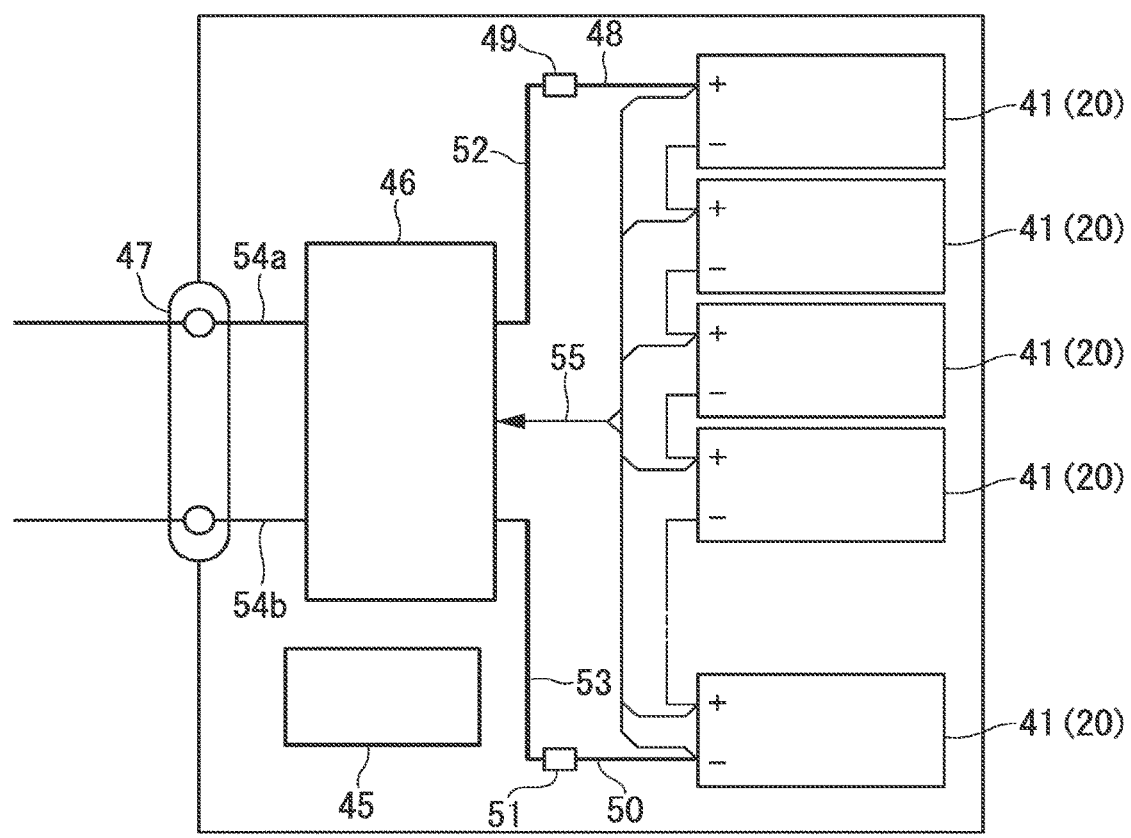
FIG. 6 is a block diagram illustrating the electric circuit of the battery pack of FIG. 5.

Referring to FIG. 5 and FIG. 6, the nonaqueous electrolyte secondary battery pack 40 is described in detail. In the battery pack 40, the flat type nonaqueous electrolyte battery 20 illustrated in FIG. 1 is used as the single battery 41.

The plurality of single batteries 41 is laminated so that the negative electrode terminals 26 and the positive electrode terminals 27 extending to the outside are arranged in the same direction, and thus the assembled batteries 43 are configured by fastening with the adhesive tape 42. These single batteries 41 are connected mutually and electrically in series, as illustrated in FIG. 5 and FIG. 6.

The printed wiring board 44 is disposed to face the side surfaces of the single batteries 41 in which the negative electrode terminals 26 and the positive electrode terminals 27 extend. As illustrated in FIG. 5, the thermistor 45 (see FIG. 6), the protective circuit 46 and the electrifying terminal 47 to an external device are mounted on the printed wiring board 44. Herein, an insulation plate (not illustrated) is mounted on the surface of the printed wiring board 44 facing the assembled batteries 43 in order to avoid unnecessary connection with wirings of the assembled batteries 43.

The positive electrode-side lead 48 is connected to the positive electrode terminal 27 located in the lowermost layer of the assembled batteries 43, and the front end of the positive electrode-side lead is inserted into the positive electrode-side connector 49 of the printed wiring board 44 to be electrically connected. The negative electrode-side lead 50 is connected to the negative electrode terminal 26 located in the uppermost layer of the assembled batteries 43, and the front end of the negative electrode-side lead is inserted into the negative electrode-side connector 51 of the printed wiring board 44 to be electrically connected. These positive electrode-side connector 49 and negative electrode-side connector 51 are connected to the protective circuit 46 via wirings 52 and 53 (see FIG. 6) formed in the printed wiring board 44.

The thermistor 45 is used to detect a temperature of the single battery 41. Although not illustrated in FIG. 5, the thermistor is installed near the single batteries 41, and a detection signal is transmitted to the protective circuit 46. The protective circuit 46 can block the plus-side wiring 54a and the minus-side wiring 54b between the protective circuit 46 and the electrifying terminal 47 for an external device under a predetermined condition. Here, for example, the predetermined condition means that the detection temperature of the thermistor 45 becomes equal to or greater than a predetermined temperature. In addition, the predetermined condition also means that an overcharge, overdischarge, overcurrent, or the like of the single battery 41 be detected. The detection of the overcharge or the like is performed for the respective single batteries 41 or all of the single batteries 41. Herein, when the overcharge or the like is detected in the respective single batteries 41, a battery voltage may be detected, or a positive electrode potential or a negative electrode potential may be detected. In the latter case, a lithium electrode used as a reference electrode is inserted into the respective single batteries 41. In the case of FIG. 5 and FIG. 6, wirings 55 for voltage detection are connected to the respective single batteries 41 and detection signals are transmitted to the protective circuit 46 via the wirings 55.

As illustrated in FIG. 5, the protective sheets 56 formed of rubber or resin are disposed on three side surfaces of the assembled batteries 43 excluding the side surface from which the positive electrode terminals 27 and the negative electrode terminals 26 protrude.

The assembled batteries 43 are stored together with the respective protective sheets 56 and the printed wiring board 44 in the storing container 57. That is, the protective sheets 56 are disposed on both of the inner surfaces of the storing container 57 in the longer side direction and the inner surface in the shorter side direction, and the printed wiring board 44 is disposed on the inner surface opposite to the protective sheet 56 in the shorter side direction. The assembled batteries 43 are located in a space surrounded by the protective sheets 56 and the printed wiring board 44. The cover 58 is mounted on the upper surface of the storing container 57.

When the assembled batteries 43 are fixed, a thermal shrinkage tape may be used instead of the adhesive tape 42. In this case, protective sheets are disposed on both side surfaces of the assembled batteries, the thermal shrinkage tape is circled, and then the thermal shrinkage tape is subjected to thermal shrinkage, so that the assembled batteries are fastened.

Here, in FIG. 5 and FIG. 6, the single batteries 41 connected in series are illustrated. However, to increase a battery capacity, the single batteries 41 may be connected in parallel or may be connected in a combination form of series connection and parallel connection. The assembled battery packs can also be connected in series or in parallel.

According to the aforementioned present embodiment, it is possible to provide the battery pack. The battery pack according to the present embodiment includes at least one of the aforementioned nonaqueous electrolyte batteries according to the 2nd embodiment.

This kind of battery pack is excellent in large current characteristics and low-temperature characteristics.

Herein, the form of the battery pack can be appropriately modified according to a use application. Specifically, the battery pack according to the present invention can be used for power of digital cameras, a two-wheeled or four-wheeled hybrid electric vehicle, a two-wheeled or four-wheeled electric vehicle, an assist bicycle, and the like.

According to at least one of the embodiments described above, the electrode for a nonaqueous electrolyte battery includes the current collector and the active material layer that is formed on one surface or both surfaces of the current collector, and the active material layer contains the fluorine-containing aromatic compound, in which at least one of hydrogen atoms bonded to the aromatic ring has been substituted by fluorine, at 0.01 mass % or more and 1.0 mass % or less. Accordingly, it is possible to realize the nonaqueous electrolyte battery and the nonaqueous electrolyte secondary battery pack which are excellent in large current characteristics and low-temperature characteristics.

EXAMPLES

Hereinafter, the aforementioned embodiments are described in more details by using the examples.

Example 1

The following production method was used to produce the nonaqueous electrolyte battery including the negative electrode, the positive electrode, the nonaqueous electrolyte, the separator and the exterior material.
(Positive Electrode)

$LiCoO_2$ (95 mass %) was used as the positive electrode active material, polyvinylidene fluoride (PVdF) (2 mass %) was used as the binder, and acetylene black (3 mass %) was used as the electroconductive material. Then, these were charged in the planetary mixer together with N-methyl-2-pyrrolidone (NMP) which was the solvent, and the stirring and mixing were carried out, to thereby produce the suspension solution (electrode slurry). Subsequently, the suspension solution was applied on one surface of the aluminum foil which was the current collector, and was dried to form the active material-containing layer.

Also, 1,3,6,8-tetrafluoronaphthalene which was the fluorine-containing aromatic compound and was represented by formula (1) was used. This compound was mixed with chloroform at the volume ratio of 1:99 (fluorine-containing aromatic compound:chloroform), to thereby prepare the fluorine-containing aromatic compound solution.

Thereafter, the active material-containing layer formed on one surface of the current collector was impregnated with the fluorine-containing aromatic compound solution, followed by drying (hereinafter may be referred to as "impregnating step"). The aforementioned process was carried out to thereby obtain the positive electrode which had the positive electrode active material layer containing the fluorine-containing aromatic compound.

The positive electrode active material layer obtained was stripped and recovered from the positive electrode obtained in the aforementioned manner, and then, the fluorine-containing aromatic compound was extracted by the Soxhlet method using chloroform as a solvent. Thereafter, the extracted fluorine-containing aromatic compound was analyzed by the gas chromatograph mass spectrometer, and the results were used to determine the quantity thereof. As a result, it was found that the fluorine-containing aromatic compound contained in the positive electrode active material layer was 0.05 mass %.
(Negative Electrode)

The graphite having an average particle size of 10 μm (44 mass %) was used as the negative electrode active material, acrylic acid-modified PVdF (12 mass %) was used as the binder, and the graphite having an average particle size of 5 µm (44 mass %) was used as the electroconductive material. Then, these were charged in the planetary mixer together with NMP which was the solvent, and the stirring and mixing were carried out, to thereby produce the suspension solution. Subsequently, the suspension solution was applied on one surface of the copper foil which was the current collector, and was dried to form the negative electrode active material layer. Through this process, the negative electrode was produced.

(Nonaqueous Electrolyte Solution)

$LiPF_6$ was dissolved in the solution obtained by mixing ethylene carbonate (EC) and ethyl methyl carbonate (EMC) at a volume ratio of 1:2, to thereby prepare the 1M nonaqueous electrolyte solution.

(Separator)

As a separator, the polypropylene porous film was used.

(Exterior Material)

The exterior material made of an aluminum laminate film was prepared.

(Nonaqueous Electrolyte Secondary Battery)

The aforementioned positive electrode and negative electrode were cut into the square of 50 mm depth and 30 mm width. Subsequently, the lead made of aluminum was placed onto the aluminum foil exposed part of the positive electrode, and the lead made of nickel was placed onto the copper foil exposed part of the negative electrode.

Then, the positive electrode and the negative electrode were placed through the separator such that the positive electrode active material layer and the negative electrode active material layer became inward-looking, and were housed in the exterior material in a state that the lead wire extended outside. Thereafter, the nonaqueous electrolyte solution was poured in the exterior material, and was sealed under reduced pressure by heat sealing, to thereby obtain the nonaqueous electrolyte secondary battery.

Herein, the capacity ratio of the positive electrode and the negative electrode of the nonaqueous electrolyte secondary battery was set to 1:1.05. Also, the battery design was carried out such that the reference capacity measured by the following method became 100 mAh. The following C rate shows the current value with respect to the battery capacity of 100 mAh.

(Reference Capacity)

The constant current, constant voltage (CCCV) charge at the voltage of 4.2 V and the constant current (CC) discharge at the voltage of 3.0 V were carried out under the conditions of 25° C. and 0.2 C, and the 3rd discharge capacity (102 mAh) was defined as the reference capacity.

Example 2

The nonaqueous electrolyte secondary battery was produced and evaluated in the same manner as in Example 1 except that the mixing ratio of the fluorine-containing aromatic compound and chloroform was set to 5:95 (fluorine-containing aromatic compound:chloroform). The fluorine-containing aromatic compound contained in the positive electrode active material layer was 0.95 mass %. Also, the reference capacity was 102 mAh.

Example 3

The nonaqueous electrolyte secondary battery was produced and evaluated in the same manner as in Example 1 except that $Li(Ni_{5/10}Co_{2/10}Mn_{3/10})O_2$ was used as the positive electrode active material. The fluorine-containing aromatic compound contained in the positive electrode active material layer was 0.03 mass %. Also, the reference capacity was 106 mAh.

Example 4

The nonaqueous electrolyte secondary battery was produced and evaluated in the same manner as in Example 3 except that the mixing ratio of the fluorine-containing aromatic compound and chloroform was set to 3:97 (fluorine-containing aromatic compound:chloroform). The fluorine-containing aromatic compound contained in the positive electrode active material layer was 0.09 mass %. Also, the reference capacity was 106 mAh.

Example 5

The nonaqueous electrolyte secondary battery was produced and evaluated in the same manner as in Example 3 except that the mixing ratio of the fluorine-containing aromatic compound and chloroform was set to 5:95 (fluorine—containing aromatic compound: chloroform). The fluorine-containing aromatic compound contained in the positive electrode active material layer was 0.90 mass %. Also, the reference capacity was 106 mAh.

Example 6

The nonaqueous electrolyte secondary battery was produced and evaluated in the same manner as in Example 4 except that 1,4,5,8-tetrafluoronaphthalene represented by the formula (2) was used as the fluorine-containing aromatic compound. The fluorine-containing aromatic compound contained in the positive electrode active material layer was 0.08 mass %. Also, the reference capacity was 106 mAh.

Example 7

The nonaqueous electrolyte secondary battery was produced and evaluated in the same manner as in Example 5 except that octafluoronaphthalene represented by the formula (3) was used as the fluorine-containing aromatic compound. The fluorine-containing aromatic compound contained in the positive electrode active material layer was 0.03 mass %. Also, the reference capacity was 106 mAh.

Example 8

The nonaqueous electrolyte secondary battery was produced and evaluated in the same manner as in Example 5 except that 1-fluoronaphthalene represented by the formula (4) was used as the fluorine-containing aromatic compound. The fluorine-containing aromatic compound contained in the positive electrode active material layer was 0.01 mass %. Also, the reference capacity was 106 mAh.

Example 9

The nonaqueous electrolyte secondary battery was produced and evaluated in the same manner as in Example 4 except that $LiNi_{0.9}Al_{0.1}O_2$ was used as the positive electrode active material. The fluorine-containing aromatic compound contained in the positive electrode active material layer was 0.15 mass %. Also, the reference capacity was 102 mAh.

Example 10

The nonaqueous electrolyte secondary battery was produced and evaluated in the same manner as in Example 3 except that the acrylic resin (2 mass %) was used as the positive electrode binder. The fluorine-containing aromatic compound contained in the positive electrode active material layer was 0.02 mass %. Also, the reference capacity was 104 mAh.

Example 11

(Positive Electrode)

The electrode, which was produced by forming the active material-containing layer on one surface of the current collector formed in Example 3 without carrying out the impregnating step, was used as the positive electrode.

(Negative Electrode)

The graphite having an average particle size of 10 μm (44 mass %) was used as the negative electrode active material, acrylic acid-modified PVdF (12 mass %) was used as the binder, and the graphite having an average particle size of 5 μm (44 mass %) was used as the electroconductive material. Then, these were charged in the planetary mixer together with NMP which was the solvent, and the stirring and mixing were carried out, to thereby produce the suspension solution (electrode slurry). Subsequently, the suspension solution was applied on one surface of the copper foil which was the current collector, and was dried to form the active material-containing layer.

Also, 1,3,6,8-tetrafluoronaphthalene which was the fluorine-containing aromatic compound and was represented by formula (1) was used. This compound was mixed with chloroform at the volume ratio of 1:99 (fluorine-containing aromatic compound:chloroform), to thereby prepare the fluorine-containing aromatic compound solution.

Thereafter, the active material-containing layer formed on one surface of the current collector was impregnated with the fluorine-containing aromatic compound solution, followed by drying. The aforementioned process was carried out to thereby obtain the negative electrode which had the negative electrode active material layer containing the fluorine-containing aromatic compound.

The negative electrode active material layer obtained was stripped and recovered from the negative electrode obtained in the aforementioned manner, and then, the fluorine-containing aromatic compound was extracted by the Soxhlet method using chloroform as a solvent. Thereafter, the extracted fluorine-containing aromatic compound was analyzed by the gas chromatograph mass spectrometer, and the results were used to determine the quantity thereof. As a result, it was found that the fluorine-containing aromatic compound contained in the negative electrode active material layer was 0.03 mass %.

The nonaqueous electrolyte secondary battery was produced and evaluated in the same manner as in Example 1 except for using the aforementioned positive electrode and negative electrode. The reference capacity was 106 mAh.

Example 12

The nonaqueous electrolyte secondary battery was produced and evaluated in the same manner as in Example 11 except that the positive electrode obtained in the same manner as in Example 3 was used as the positive electrode. The fluorine-containing aromatic compound contained in the positive electrode active material layer was 0.03 mass %, and the fluorine-containing aromatic compound contained in the negative electrode active material layer was 0.03 mass %. Also, the reference capacity was 106 mAh.

Comparative Example 1

The nonaqueous electrolyte secondary battery was produced and evaluated in the same manner as in Example 1 except that the electrode, which was produced by forming the active material-containing layer on one surface of the current collector formed in Example 1 without carrying out the impregnating step, was used as the positive electrode. The fluorine-containing aromatic compound contained in the positive electrode active material layer was 0 mass %. Also, the reference capacity was 100 mAh.

Comparative Example 2

The nonaqueous electrolyte secondary battery was produced and evaluated in the same manner as in Example 3 except that the electrode, which was produced by forming the active material—containing layer on one surface of the current collector formed in Example 3 without carrying out the impregnating step, was used as the positive electrode. The fluorine-containing aromatic compound contained in the positive electrode active material layer was 0 mass %. Also, the reference capacity was 100 mAh.

Comparative Example 3

The nonaqueous electrolyte secondary battery was produced and evaluated in the same manner as in Example 3 except that the mixing ratio of the fluorine-containing aromatic compound and chloroform was set to 0.1:99.9 (fluorine-containing aromatic compound:chloroform). The fluorine-containing aromatic compound contained in the positive electrode active material layer was 0.003 mass %. Also, the reference capacity was 100 mAh.

Comparative Example 4

The nonaqueous electrolyte secondary battery was produced and evaluated in the same manner as in Example 3 except that the mixing ratio of the fluorine-containing aromatic compound and chloroform was set to 10:90 (fluorine—containing aromatic compound: chloroform) and the impregnating step was repeatedly carried out for 3 times. The fluorine-containing aromatic compound contained in the positive electrode active material layer was 1.7 mass %. Also, the reference capacity was 92 mAh.

Comparative Example 5

The nonaqueous electrolyte secondary battery was produced and evaluated in the same manner as in Example 9 except that the electrode, which was produced by forming the active material-containing layer on one surface of the current collector formed in Example 9 without carrying out the impregnating step, was used as the positive electrode. The fluorine-containing aromatic compound contained in the positive electrode active material layer was 0 mass %. Also, the reference capacity was 100 mAh.

Comparative Example 6

The nonaqueous electrolyte secondary battery was produced and evaluated in the same manner as in Example 10 except that the electrode, which was produced by forming the active material-containing layer on one surface of the current collector formed in Example 10 without carrying out the impregnating step, was used as the positive electrode.

The fluorine-containing aromatic compound contained in the positive electrode active material layer was 0 mass %. Also, the reference capacity was 100 mAh.

Table 1 and Table 2 show the type of the electrode including the fluorine-containing aromatic compound in the nonaqueous electrolyte secondary batteries of Examples and Comparative Examples. Also, Table 1 and Table 2 show the type of the negative electrode binder, the positive electrode active material, the positive electrode binder, and the fluorine—containing aromatic compound used in Examples and Comparative Examples. Also, Table 1 and Table 2 show the content of the fluorine-containing aromatic compound used in Examples and Comparative Examples.

The discharge capacities of the nonaqueous electrolyte secondary battery of Examples and Comparative Examples produced in the aforementioned manner were measured under the conditions described below. Table 3 shows the results.

(Discharge Capacity at 25° C. and 3C)

The CCCV charge was carried out at the voltage of 4.2 V, 25° C. and 0.2C, and then the CC discharge was carried out at the voltage of 3.0 V, 25° C. and 3C, to thereby measure the discharge capacity and obtain the capacity holding ratio (%) with respect to the reference capacity ((discharge capacity/reference capacity)×100(%)).

(Discharge Capacity at 0° C. and 0.2C)

The CCCV charge at the voltage of 4.2 V and the cc discharge at the voltage of 3.0 V were repeated for 3 times under the condition of 25° C. and 0.2C. Thereafter, the CCCV charge at the voltage of 4.2 V was carried out under the condition of 25° C. and 0.2C, and then, the electrode was stored in the 0° C. thermostatic chamber for 4 hours. Thereafter, the CC discharge was carried out at the voltage of 3.0 V, 0° C. and 0.2C, to thereby measure the discharge capacity and obtain the capacity holding ratio (%) with respect to the reference capacity ((discharge capacity/reference capacity)×100(%)).

TABLE 1

| | Electrode Including Fluorine-Containing Aromatic Compound | Negative Electrode Binder | Positive Electrode Active Material | Positive Electrode Binder | Fluorine-Containing Aromatic Compound | Content (mass %) |
|---|---|---|---|---|---|---|
| Example 1 | Positive Electrode | Acrylic Acid-Modified PVdF | $LiCoO_2$ | PVdF | 1,3,6,8-Tetrafluoronaphthalene | 0.05 |
| Example 2 | Positive Electrode | Acrylic Acid-Modified PVdF | $LiCoO_2$ | PVdF | 1,3,6,8-Tetrafluoronaphthalene | 0.95 |
| Example 3 | Positive Electrode | Acrylic Acid-Modified PVdF | $Li(Ni_{5/10}Co_{2/10}Mn_{3/10})O_2$ | PVdF | 1,3,6,8-Tetrafluoronaphthalene | 0.03 |
| Example 4 | Positive Electrode | Acrylic Acid-Modified PVdF | $Li(Ni_{5/10}Co_{2/10}Mn_{3/10})O_2$ | PVdF | 1,3,6,8-Tetrafluoronaphthalene | 0.09 |
| Example 5 | Positive Electrode | Acrylic Acid-Modified PVdF | $Li(Ni_{5/10}Co_{2/10}Mn_{3/10})O_2$ | PVdF | 1,3,6,8-Tetrafluoronaphthalene | 0.90 |
| Example 6 | Positive Electrode | Acrylic Acid-Modified PVdF | $Li(Ni_{5/10}Co_{2/10}Mn_{3/10})O_2$ | PVdF | 1,4,5,8-Tetrafluoronaphthalene | 0.08 |
| Example 7 | Positive Electrode | Acrylic Acid-Modified PVdF | $Li(Ni_{5/10}Co_{2/10}Mn_{3/10})O_2$ | PVdF | Octafluoronaphthalene | 0.03 |
| Example 8 | Positive Electrode | Acrylic Acid-Modified PVdF | $Li(Ni_{5/10}Co_{2/10}Mn_{3/10})O_2$ | PVdF | 1-Fluoronaphthalene | 0.01 |
| Example 9 | Positive Electrode | Acrylic Acid-Modified PVdF | $LiNi_{0.9}Al_{0.1}O_2$ | PVdF | 1,3,6,8-Tetrafluoronaphthalene | 0.15 |
| Example 10 | Positive Electrode | Acrylic Acid-Modified PVdF | $Li(Ni_{5/10}Co_{2/10}Mn_{3/10})O_2$ | Acrylic Resin | 1,3,6,8-Tetrafluoronaphthalene | 0.02 |
| Example 11 | Negative Electrode | Acrylic Acid-Modified PVdF | $Li(Ni_{5/10}Co_{2/10}Mn_{3/10})O_2$ | PVdF | 1,3,6,8-Tetrafluoronaphthalene | 0.03 |
| Example 12 | Positive and Negative Electrodes | Acrylic Acid-Modified PVdF | $Li(Ni_{5/10}Co_{2/10}Mn_{3/10})O_2$ | PVdF | 1,3,6,8-Tetrafluoronaphthalene (Positive and Negative Electrodes) | 0.03 (Positive Electrode) 0.03 (Negative Electrode) |

TABLE 2

| | Electrode Including Fluorine-Containing Aromatic Compound | Negative Electrode Binder | Positive Electrode Active Material | Positive Electrode Binder | Fluorine-Containing Aromatic Compound | Content (mass %) |
|---|---|---|---|---|---|---|
| Comparative Example 1 | N/A | Acrylic Acid-Modified PVdF | LiCoO$_2$ | PVdF | — | — |
| Comparative Example 2 | N/A | Acrylic Acid-Modified PVdF | Li(Ni$_{5/10}$Co$_{2/10}$Mn$_{3/10}$)O$_2$ | PVdF | — | — |
| Comparative Example 3 | Positive Electrode | Acrylic Acid-Modified PVdF | Li(Ni$_{5/10}$Co$_{2/10}$Mn$_{3/10}$)O$_2$ | PVdF | 1,3,6,8-Tetrafluoronaphthalene | 0.003 |
| Comparative Example 4 | Positive Electrode | Acrylic Acid-Modified PVdF | Li(Ni$_{5/10}$Co$_{2/10}$Mn$_{3/10}$)O$_2$ | PVdF | 1,3,6,8-Tetrafluoronaphthalene | 1.7 |
| Comparative Example 5 | N/A | Acrylic Acid-Modified PVdF | LiNi$_{0.9}$Al$_{0.1}$O$_2$ | PVdF | — | — |
| Comparative Example 6 | N/A | Acrylic Acid-Modified PVdF | Li(Ni$_{5/10}$Co$_{2/10}$Mn$_{3/10}$)O$_2$ | Acrylic Resin | — | — |

TABLE 3

| | Capacity Holding Ratio at 25° C. and 3 C | Capacity Holding Ratio at 0° C. and 0.2 C |
|---|---|---|
| Example 1 | 94 | 85 |
| Example 2 | 92 | 84 |
| Example 3 | 91 | 88 |
| Example 4 | 95 | 90 |
| Example 5 | 94 | 87 |
| Example 6 | 93 | 78 |
| Example 7 | 86 | 80 |
| Example 8 | 89 | 79 |
| Example 9 | 93 | 84 |
| Example 10 | 90 | 86 |
| Example 11 | 85 | 91 |
| Example 12 | 95 | 92 |
| Comparative Example 1 | 70 | 76 |
| Comparative Example 2 | 80 | 74 |
| Comparative Example 3 | 81 | 74 |
| Comparative Example 4 | 93 | 65 |
| Comparative Example 5 | 84 | 72 |
| Comparative Example 6 | 85 | 73 |

As shown in Table 3, it was confirmed that, in the nonaqueous electrolyte secondary batteries of Examples 1 to 12, both of the discharge capacities at 25° C. and 3C and the discharge capacities at 0° C. and 0.2C were good, and both of large current discharge characteristics and low temperature discharge characteristics were good.

By contrast, in the nonaqueous electrolyte secondary batteries of Comparative Examples 1, 2, 5 and 6 which did not contain the fluorine-containing aromatic compound and the nonaqueous electrolyte secondary battery of Comparative Examples 3 which contained the fluorine-containing aromatic compound at a small content, the discharge capacities at 25° C. and 3C and the discharge capacities at 0° C. and 0.2C were lower than those in Examples 1 to 12.

Also, in the nonaqueous electrolyte secondary battery of Comparative Example 4 which contained the fluorine-containing aromatic compound at a large content, the discharge capacity at 25° C. and 3C was good, but the discharge capacity at 0° C. and 0.2C was low. It can be considered that this result was caused by the non-uniform deterioration of the positive electrode caused by the large content of the fluorine-containing aromatic compound.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electrode for a nonaqueous electrolyte battery, comprising:
   a current collector; and
   an active material layer that is formed on one surface or both surfaces of the current collector, wherein
   the active material layer contains a fluorine-containing aromatic compound, in which at least one of hydrogen atoms bonded to an aromatic ring of the fluorine-containing aromatic compound has been substituted by fluorine, at 0.01 mass% or more and 1.0 mass% or less.

2. The electrode for a nonaqueous electrolyte battery according to claim 1, wherein the fluorine-containing aromatic compound has a carbon number of 7 or more and 30 or less.

3. The electrode for a nonaqueous electrolyte battery according to claim 1, wherein the fluorine-containing aromatic compound has at least one structure selected from the group consisting of a naphthalene, anthracene, phenanthrene, tetracene, benzanthracene, triphenylene, chrysene, pyrene and pentacene.

4. The electrode for a nonaqueous electrolyte battery according to claim 1, wherein the fluorine-containing aromatic compound has 3 or more and 15 or less fluorine atoms.

5. The electrode for a nonaqueous electrolyte battery according to claim 1, wherein the fluorine-containing aromatic compound is at least one selected from the group consisting of tetrafluoronaphthalene, pentafluoroanthracene, pentafluorophenanthrene, hexafluorotetracene, hexafluorobenz anthracene and hexafluorochrysene.

6. The electrode for a nonaqueous electrolyte battery according to claim 1, wherein the active material layer contains a fluorinated resin.

7. The electrode for a nonaqueous electrolyte battery according to claim 6, wherein the fluorinated resin is a resin having, as a main component, at least one monomer selected from the group consisting of vinyl fluoride, vinylidene fluoride, chlorofluoroethylene, hexafluoropropene and trifluorochloroethylene.

8. The electrode for a nonaqueous electrolyte battery according to claim 6, wherein the fluorinated resin contains at least one monomer selected from the group consisting of acrylic acid, sodium acrylate, lithium acrylate and an acrylic ester.

9. A nonaqueous electrolyte battery comprising:
a negative electrode;
a positive electrode;
a nonaqueous electrolyte; a separator and
an exterior material, wherein
one or both of the positive electrode and the negative electrode is the electrode for a nonaqueous electrolyte battery according to claim 1.

10. A battery pack comprising the nonaqueous electrolyte battery according to claim 9.

* * * * *